(12) United States Patent
Wang et al.

(10) Patent No.: US 10,521,687 B2
(45) Date of Patent: Dec. 31, 2019

(54) SHAPE RECOGNITION DEVICE, SHAPE RECOGNITION METHOD, AND PROGRAM

(71) Applicant: FANUC CORPORATION, Minamitsuru-gun, Yamanashi (JP)

(72) Inventors: Kaimeng Wang, Yamanashi (JP); Wenjie Chen, Yamanashi (JP); Kouichirou Hayashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 6 days.

(21) Appl. No.: 15/964,472

(22) Filed: Apr. 27, 2018

(65) Prior Publication Data

US 2018/0341828 A1 Nov. 29, 2018

(30) Foreign Application Priority Data

May 26, 2017 (JP) .................. 2017-104819

(51) Int. Cl.
| | | |
|---|---|---|
| G06K 9/00 | (2006.01) | |
| G06K 9/38 | (2006.01) | |
| G06K 9/34 | (2006.01) | |
| B25J 13/02 | (2006.01) | |
| B25J 9/16 | (2006.01) | |
| G06K 9/62 | (2006.01) | |

(52) U.S. Cl.
CPC ............ *G06K 9/38* (2013.01); *B25J 9/1697* (2013.01); *B25J 13/02* (2013.01); *G06K 9/00201* (2013.01); *G06K 9/346* (2013.01); *G06K 9/6201* (2013.01); *G06K 2209/19* (2013.01)

(58) Field of Classification Search
None
See application file for complete search history.

(56) References Cited

U.S. PATENT DOCUMENTS

| 6,414,711 B2* | 7/2002 | Arimatsu ............ G05B 19/404 348/130 |
|---|---|---|
| 2004/0076318 A1* | 4/2004 | Faeldt .................. G06T 7/0012 382/128 |
| 2011/0166824 A1* | 7/2011 | Haisty ..................... G01B 5/12 702/157 |

FOREIGN PATENT DOCUMENTS

| CN | 101425178 | 5/2009 |
|---|---|---|
| CN | 101970184 | 2/2011 |
| CN | 105809168 | 7/2016 |

(Continued)

OTHER PUBLICATIONS

Notification of Reasons for Refusal dated Dec. 18, 2018 in Japanese Patent Application No. 2017-104819.

(Continued)

*Primary Examiner* — Vikkram Bali
(74) *Attorney, Agent, or Firm* — Wenderoth, Lind & Ponack, L.L.P.

(57) ABSTRACT

A shape recognition device that recognizes a shape of an object having an indefinite shape and flexibility, and assembled by a robot, the shape recognition device including: an imaging unit that images the object; an image processing unit that recognizes the shape of the object on the basis of the object imaged by the imaging unit; and a simulation processing unit that simulates the shape of the object on the basis of the image of the object imaged by the imaging unit. The simulation processing unit interpolates a recognition result of the shape of the object by the image processing unit, on the basis of a simulation result of the shape of the object.

10 Claims, 8 Drawing Sheets

(56) References Cited

FOREIGN PATENT DOCUMENTS

| | | |
|---|---|---|
| CN | 106476011 | 3/2017 |
| JP | 2-9199 | 1/1990 |
| JP | 2004-005361 | 1/2004 |
| JP | 2009-233240 | 10/2009 |
| JP | 2010-000561 | 1/2010 |
| JP | 2012-223831 | 11/2012 |

OTHER PUBLICATIONS

Office Action dated Jul. 3, 2019 in CN Patent Application No. 201810473576.8.

* cited by examiner

SHAPE RECOGNITION DEVICE, SHAPE RECOGNITION METHOD, AND PROGRAM

This application is based on and claims the benefit of priority from Japanese Patent Application. No. 2017-104819, filed on May 26, 2017, the content of which is incorporated herein by reference.

BACKGROUND OF THE INVENTION

Field of the Invention

The present invention relates to a shape recognition device, a shape recognition method, and a program.

Related Art

Conventionally, rigging of a vehicle body and cable assembly of an electronic part have been performed manually. This is mainly because a shape of a flexible object such as a cable is not stable, and automatic assembly by a robot is difficult. Patent Document 1 discloses a cable assembly device that performs cable assembly by imaging a cable.

Patent Document 1: Japanese Unexamined Patent Application, Publication No. H02-009199

SUMMARY OF THE INVENTION

In order to automate cable assembly, a shape of a cable needs to be recognized in real time. However, when a shape of a cable is recognized by using a camera (a vision sensor, or the like), imaging, image processing, and recognizing take a relatively long time. Thus, a sampling period for recognizing a shape of a cable is long. Therefore, recognizing a shape of a cable in real time is difficult. Part of a cable is sometimes hidden by a robot hand, or the like, and a shape of the cable cannot be recognized in real time only by a camera (a vision sensor, or the like) in such case. This problem may occur in various other objects having indefinite shapes having flexibility than a cable.

An object of the present invention is to realize shape recognition of an object having an indefinite shape and flexibility, in real time with high accuracy.

(1) A shape recognition device (for example, a shape recognition device 1 described later) of the present invention recognizes a shape of an object, having an indefinite shape and flexibility (for example, a cable C described later) and assembled by a robot, the shape recognition device including: an imaging unit (for example, an imaging unit 18 described later) that images the object; an image processing unit (for example, an image processing unit 11c described later) that recognizes the shape of the object on the basis of an image of the object imaged by the imaging unit; and a simulation processing unit (for example, a simulation processing unit 11d described later) that simulates the shape of the object on the basis of the image of the object imaged by the imaging unit, the shape recognition device characterized in that the simulation processing unit interpolates a recognition result of the shape of the object by the image processing unit, on the basis of a simulation result of the shape of the object.

(2) In the shape recognition device of (1), the simulation processing unit may simulate the shape of the object in a shorter period than an imaging period of the imaging unit, on the basis of the image of the object imaged by the imaging unit.

(3) In the shape recognition device of (1) or (2), the image processing unit may acquire an image in which a background portion is excluded from the image of the object imaged by the imaging unit, on the basis of the image of the object imaged by the imaging unit, and an image obtained by imaging only a background.

(4) In the shape recognition device of (3), on the basis of the image in which the background portion is excluded, and the image indicating the robot in the image in which the background portion is excluded, the image processing unit may acquire an image in which an image of the robot is excluded from the image in which the background portion is excluded.

(5) In the shape recognition devices of (1) to (4), when part of the object is missing or when there is a foreign matter in the image of the object imaged by the imaging unit, the simulation processing unit may interpolate the shape of the object or exclude the foreign matter on the basis of the simulation result of the shape of the object.

(6) In the shape recognition devices of (1) to (5), a robot control unit (for example, a robot control unit 11f described later) that generates an operation locus in which the robot is operated, on the basis of the recognition result of the shape by the image processing unit, or a recognition result of the shape of the object interpolated by the simulation processing unit.

(7) In the shape recognition device of (6), the image processing unit may specify a grip point that is set as a portion to be gripped by the robot in the object, and the robot control unit may generate the operation locus of the robot so that the robot grips the grip point specified by the image processing unit.

(8) In the shape recognition device of (7), the image processing unit may issue an alarm when the grip point of the object cannot be imaged, and set new grip point, and the robot control unit may generate the operation locus of the robot so that the newly set grip point is gripped.

(9) A shape recognition method of the present invention is for recognizing a shape of an object having an indefinite shape and flexibility and assembled by a robot, the method including: an imaging step of imaging the object; an image processing step of recognizing the shape of the object on the basis of an image of the object imaged in the imaging step; and a simulation processing step of simulating the shape of the object on the basis of the image of the object imaged in the imaging step, the shape recognition method characterized in that, in the simulation processing step, a recognition result of the shape of the object in the image processing step is interpolated on the basis of a simulation result of the shape of the object.

(10) A program of the present invention causes a computer that controls a shape recognition device that recognizes a shape of an object having an indefinite shape and flexibility assembled by a robot, to realize an imaging control function of imaging the object, an image processing function of recognizing the shape of the object on the basis of an image of the object imaged by the imaging control function, and a simulation processing function of simulating the shape of the object on the basis of the image of the object imaged by the imaging control function, the program characterized in that the simulation processing function interpolates a recognition result of the shape of the object by the image processing function on the basis of a simulation result of the shape of the object.

According to the present invention, shape recognition of an object having an indefinite shape and flexibility can be realized in real time with high accuracy.

DETAILED DESCRIPTION OF THE INVENTION

An embodiment of the present invention will be described below with reference to drawings.

[Configuration]

Figure 1:
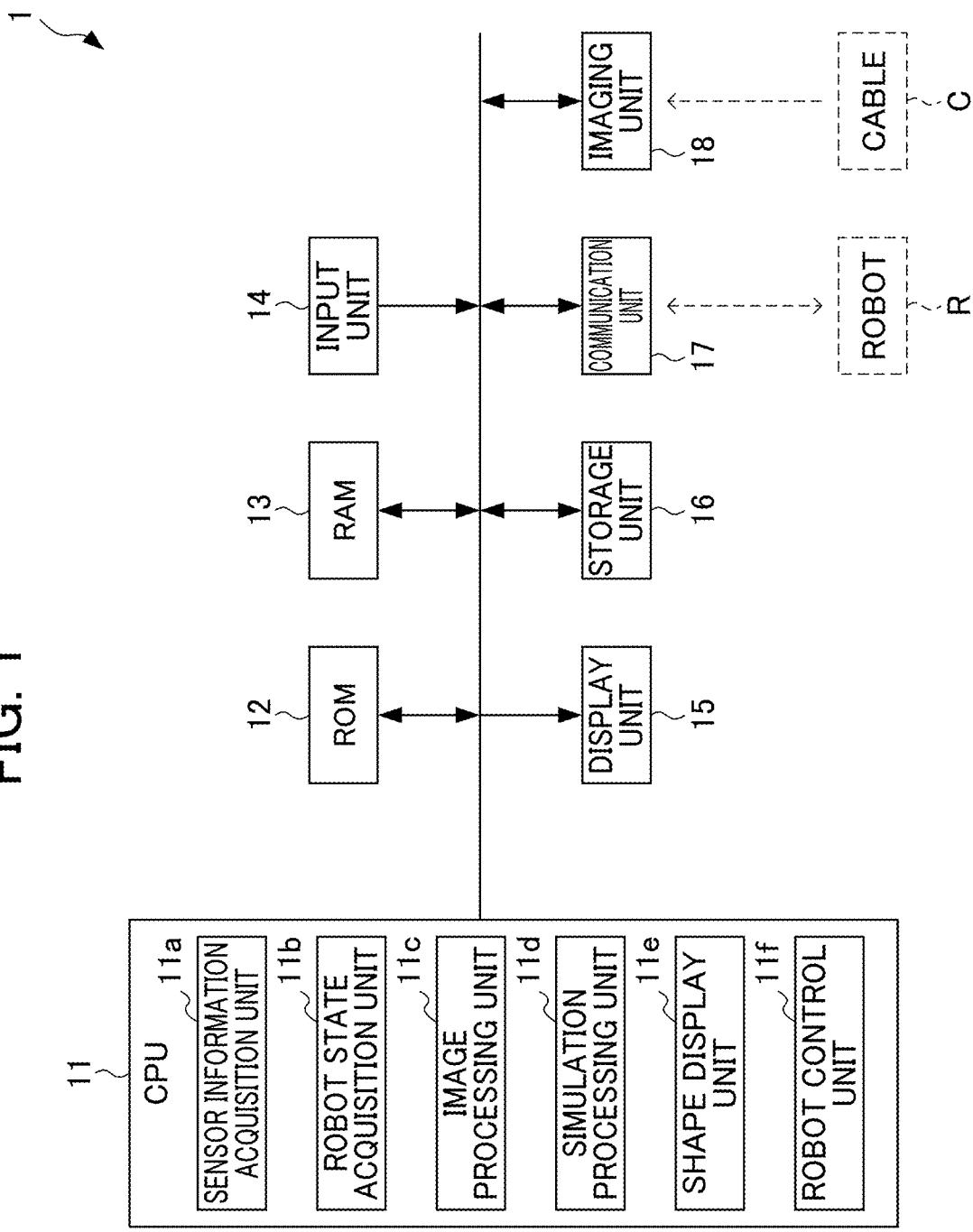
FIG. 1 is a block diagram showing a configuration of a shape recognition device according to the present embodiment.

FIG. 1 is a block diagram showing a configuration of a shape recognition device 1 according to the present embodiment. The shape recognition device 1 is a device that is installed in an assembly line in which assembly of a cable C (object having an indefinite shape) is performed by a robot R, and recognizes a shape of the cable C from a captured image to perform control of the robot R by a recognition result.

In FIG. 1, the shape recognition device 1 includes a central processing unit (CPU) 11, a ROM 12, a RAM 13, an input unit 14, a display unit 15, a storage unit 16, a communication unit 17, and an imaging unit 18. The CPU 11 executes various programs stored in the storage unit 16 to control the entire shape recognition device 1. For example, the CPU 11 executes a program for processing of performing shape recognition of the cable C (hereinafter, referred to as "shape recognition processing"), and a program for processing of performing control of the robot R by using a result of the shape recognition processing (hereinafter, referred to as "robot operation control processing").

The CPU 11 is formed with a sensor information acquisition unit 11a, a robot state acquisition unit 11b, an image processing unit 11c, a simulation processing unit 11d, a form display unit 11e, and a robot control unit 11f as functional components, by executing the programs for the shape recognition processing and the robot operation control processing.

The sensor information acquisition unit 11a acquires data of a captured image of the cable C output from the imaging unit 18, and various data (for example, data of a feature point, a position, a size, and the like) on the cable C. The sensor information acquisition unit 11a acquires data of a background image used for the shape recognition of the cable C in the shape recognition processing. The background image is an image obtained by imaging a state in which the cable C does not exist in a region in which the robot R grips the cable C, or the like.

The robot state acquisition unit 11b acquires data of a state (for example, a position and a shape of a hand portion) of the robot R on the basis of detection data (a rotation position of a motor, and the like) of each axis of the robot R, data of a model indicating the robot R, data (a viewpoint and an angle of view of a camera, and the like) of a position of the imaging unit 18 and an imaging parameter. As data of the model of the robot R, in addition to data that correctly indicates the robot R, such as data of computer aided design (CAD) indicating the robot R, data that schematically approximates the robot R, such as data of a model of a substantially cylindrical shape, can be used.

The image processing unit 11c performs image processing of recognizing the shape of the cable C on the basis of the data of the background image acquired by the sensor information acquisition unit 11a, and the data of the captured image in which the cable C is imaged. At this time, the image processing unit 11c in the present embodiment performs processing (background excluding processing) of excluding a background in the data of the captured image, and processing (robot excluding processing) of excluding the image of the robot R.

Figure 2:
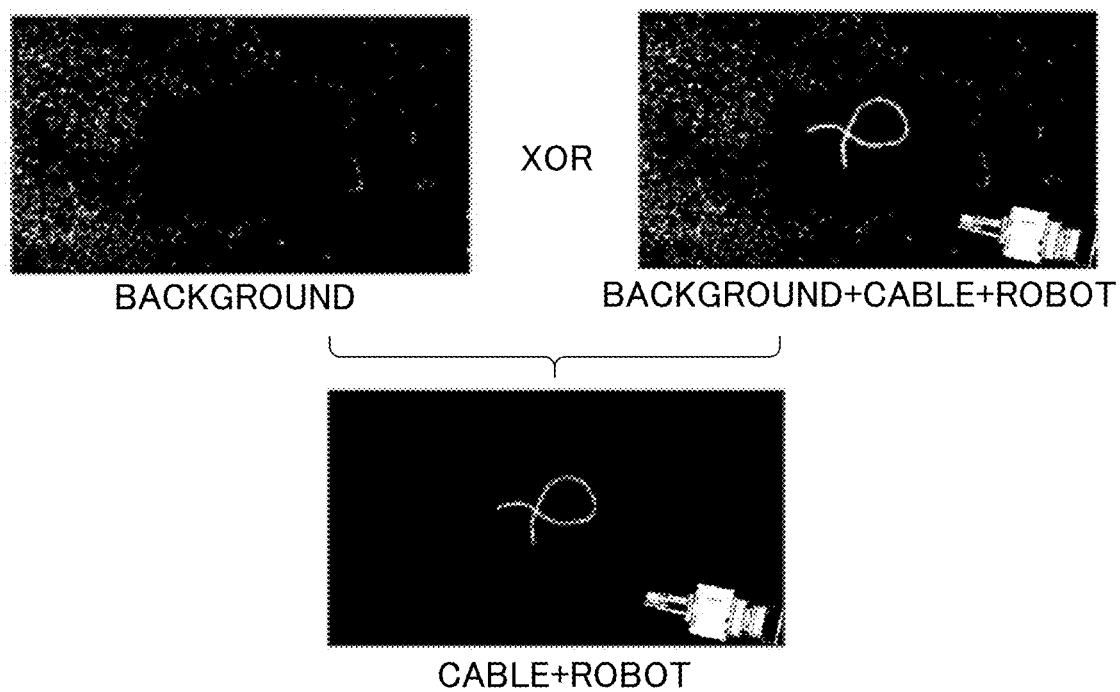
FIG. 2 is a schematic diagram showing processing (background excluding processing) of excluding a background from data of a captured image in which a cable and a robot are imaged, by using data of a background image.

FIG. 2 is a schematic diagram showing processing (background excluding processing) of excluding the background from the data of the captured image in which the cable C and the robot R are imaged, by using the data of the background image. As shown in FIG. 2, in the present embodiment, the image processing unit 11c performs logical operation of determining eXclusive OR (XOR) between data of the captured image including the cable C imaged by the same angle of view as the background image, and data of the background image. Thereby, in the captured image including the cable C, the background is excluded, and the regions of the cable C and the robot R are extracted. In addition to the logical operation of determining the XOR in this way, other methods of image processing extracting the region of the cable C, and the like, can be used.

Figure 3:
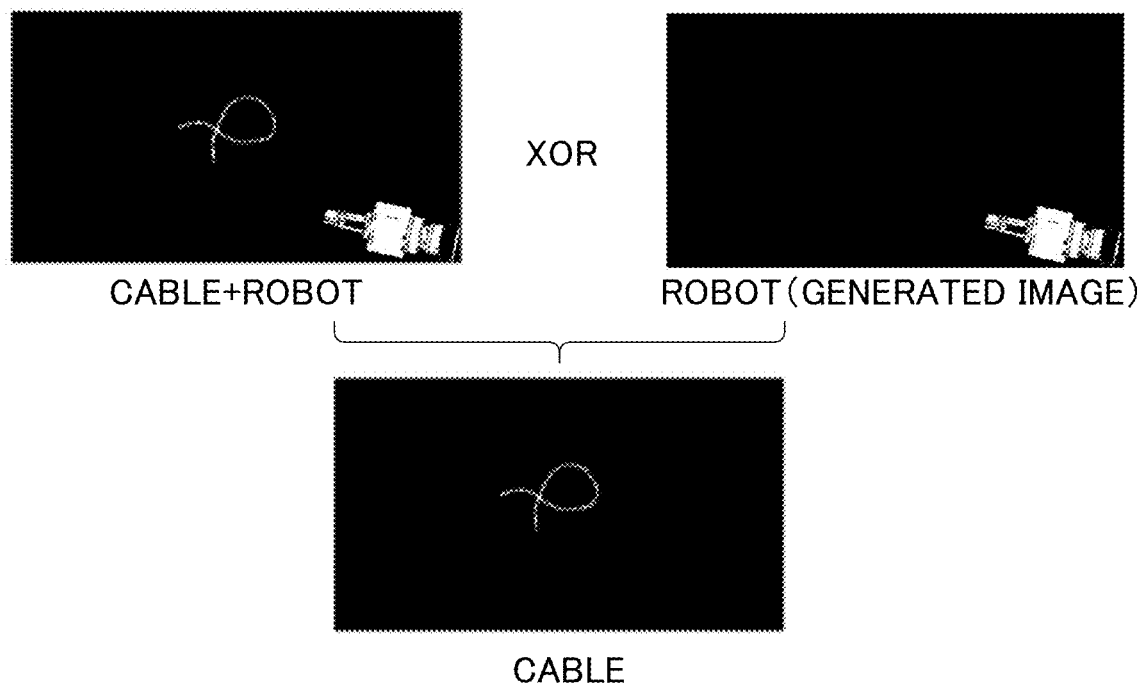
FIG. 3 is a schematic diagram showing processing (robot excluding processing) of excluding an image of a robot from data of an image from which regions of the cable and the robot are extracted.

FIG. 3 is a schematic diagram showing processing (robot excluding processing) excluding the image of the robot R from the data of the image in which the regions of the cable C and the robot R are extracted. As shown in FIG. 3, the image processing unit 11c generates data of an image including only the robot R from a current state of the robot R acquired by the robot state acquisition unit 11b. The image processing unit 11c performs logical operation of determining the XOR between the data of the image (image in which the background has been excluded) in which the regions of the cable C and the robot R are extracted, and the data of the image including only the generated robot R. Thereby, in the image including the cable C and the robot R, the image of the robot R is excluded, and the shape of the cable C is recognized. In addition to the logical operation of determining the XOR in this way, other methods of image processing in which the image of the robot R can be excluded, can be used.

Figure 4:
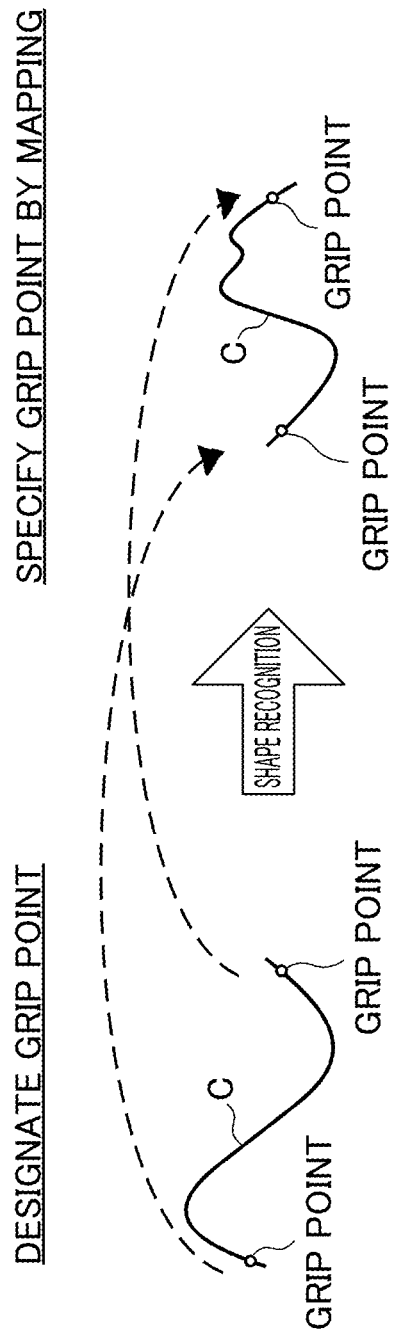
FIG. 4 is a schematic diagram showing a state in which a grip point of the cable is specified.

The image processing unit 11c shown in FIG. 1 specifies a grip point (portion of the cable C to be gripped by the robot R) designated beforehand in the recognized shape of the cable C. FIG. 4 is a schematic diagram showing a state in which the grip point of the cable C is specified. As shown in FIG. 4, the grip point of the cable C is designated by selecting a portion to be the grip point on the captured image by an operator, in a state (for example, at the time of calibration) in which the entire cable C is imaged. The image processing unit 11c continuously specifies the grip point by warping (mapping) the designated grip point on the basis of the feature point of the cable C even when the shape of the cable C changes in the operation thereafter. As an example, when an end portion of the cable C is set as the feature point, and the grip point is designated to be a position apart by a predetermined distance (for example, 50 mm) from the end portion, even when the shape of the cable changes, the position apart by the predetermined distance from the end portion of the cable C that is the feature point is continuously specified as the grip point by warping (mapping).

In the data of the captured image in which the cable C is imaged, when the grip point is hidden by an obstacle, or the like, and cannot be specified, the image processing unit 11c changes the grip point to the portion in which the cable C is imaged. For example, the image processing unit 11c sets a new grip point in a portion that is the nearest to the grip point hidden by the obstacle, or the like, in the portion in which the cable C is imaged. When the original grip point is enabled to be specified again, the newly set grip point may be discarded, and the grip point may be returned to the original grip point.

The simulation processing unit 11d shown in FIG. 1 simulates the shape of the cable C on the basis of the data of the captured image of the cable C and physical characteristics of the cable C. In the present embodiment, simulation of the shape of the cable C by the simulation processing unit 11d is performed in a shorter period (also referred to as a "period B") than a period (referred to as a "period A") in which the shape of the cable C is recognized by the image processing unit 11c. The simulation processing unit 11d interpolates the shape of the cable C recognized by the image processing unit 11c by using the simulation result. The period B/the period A is, for example, 5% to 30%.

In the present embodiment, the simulation processing unit 11d temporally interpolates time between the periods in which the shape of the cable C is recognized by the image processing unit 11c, by the simulation result. When the shape of the cable C recognized by the image processing unit 11c is partly missing (hidden), the simulation processing unit 11d physically interpolates the missing portion in the recognition result of the cable C by the simulation result.

Figure 5:
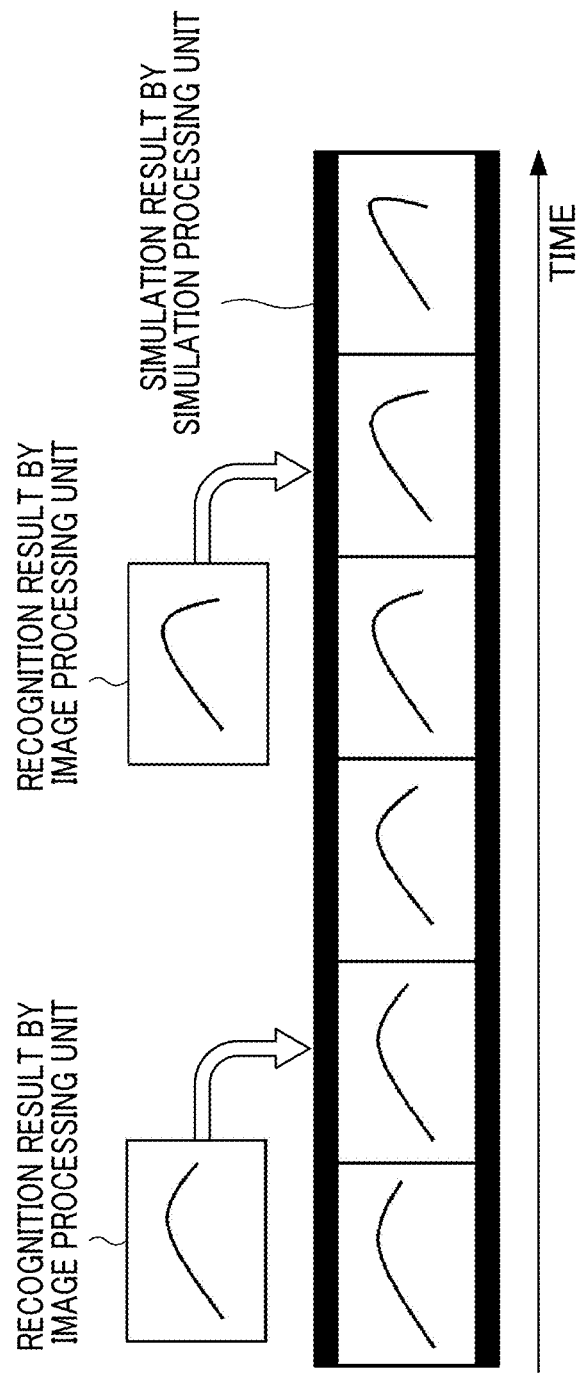
FIG. 5 is a schematic diagram showing a state in which a recognition result of an image processing unit is temporally interpolated by a simulation processing unit.

FIG. 5 is a schematic diagram showing a state in which the recognition result of the image processing unit 11c is temporally interpolated by the simulation processing unit 11d. As shown in FIG. 5, in time between timings in which the recognition result of the cable C is output by the image processing unit 11c, the simulation result of the simulation processing unit 11d is output, and thereby, the shape of the cable C can be recognized in the period that is closer to real time.

Figure 6:
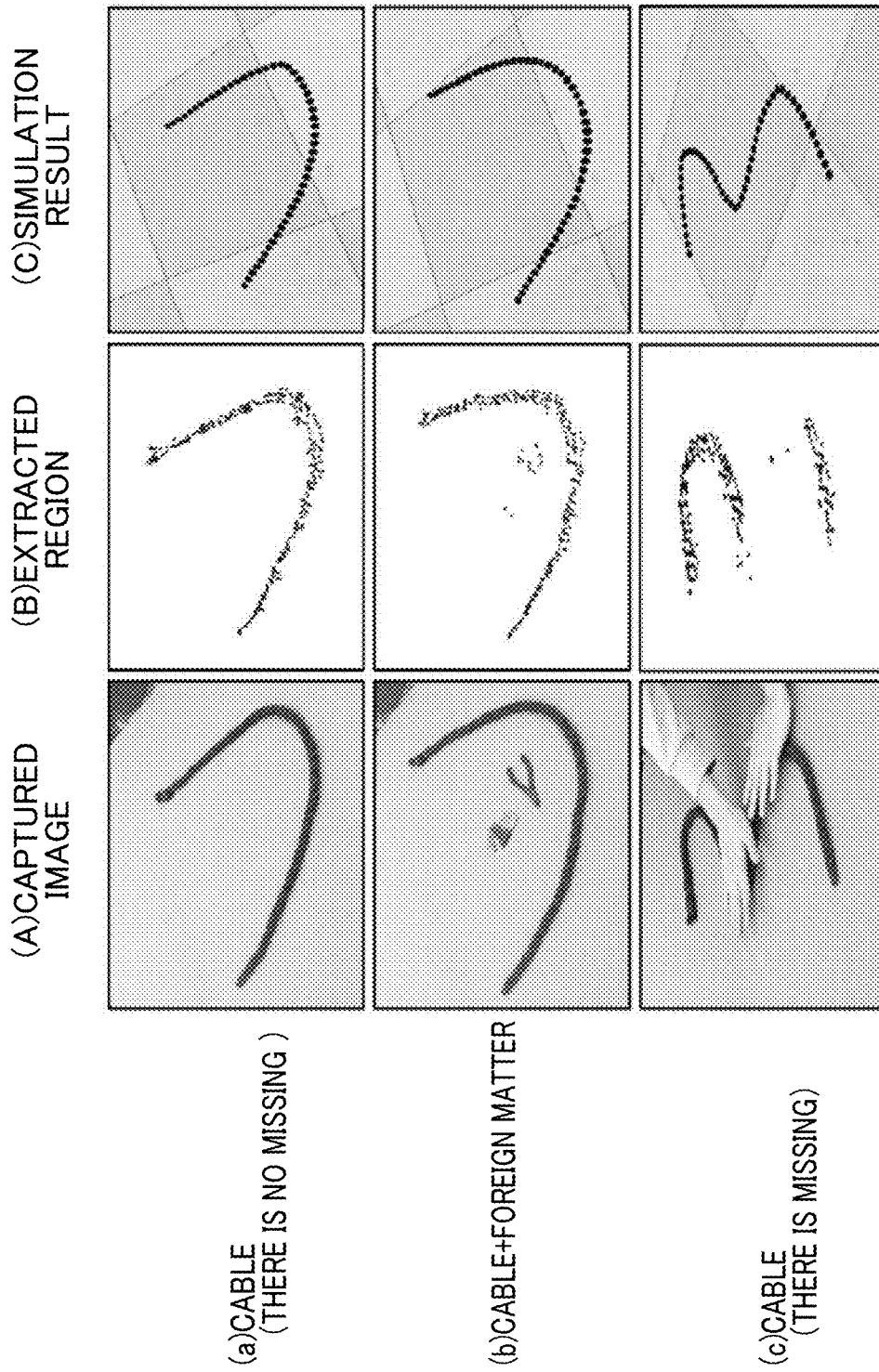
FIG. 6 is a schematic diagram showing that the recognition result of the image processing unit can be spatially interpolated by the simulation processing unit.

FIG. 6 is a schematic diagram showing that the recognition result of the image processing unit 11c can be spatially interpolated by the simulation processing unit 11d. FIG. 6 shows (A) a captured image by the imaging unit 18, (B) an extracted region of the cable C (region that is estimated to be the cable C), and (C) the simulation result of the simulation processing unit 11d in each of cases of (a) when the cable C is imaged with no missing portion, (b) when the cable C is imaged with no missing portion, with a foreign matter, and (c) when the cable C is imaged with part of the cable C missing.

As shown in FIG. 6, when the cable C is imaged with no missing portion, the region of the cable C is extracted from the captured image by the imaging unit 18, and the shape of the cable C is appropriately recognized. When the cable C is imaged with no missing portion, with a foreign matter (tool, unnecessary part, or the like), a region of the foreign matter is extracted as a region estimated as the cable C, with the region of the cable C, from the captured image by the imaging unit 18. In this case, the region of the foreign matter having low likelihood as the region of the cable C can be excluded, by using the simulation result of the simulation processing unit 11d. For example, a threshold for determining a foreign matter is set in parameters such as a color, a position, a shape, and the like of the extracted object, the parameters are compared with the simulation result of the cable C, and an object of which these parameters exceed the threshold, the object can be excluded as a foreign matter.

When the cable C is imaged with part of the cable C missing, the region of the cable C is divided and extracted. At this time, in the simulation result of the simulation processing unit 11d, a portion corresponding to the divided region of the cable C can be specified, and the shape of the cable C recognized from the captured image can be spatially interpolated. In this way, when there is a missing portion in the recognition result of the cable C output by the image processing unit 11c, the missing portion is interpolated by the simulation result of the simulation processing unit 11d, and thereby, the entire shape of the cable C can be appropriately recognized.

When the simulation processing unit 11d simulates the shape of the cable C, various method can be used. As an example, methods disclosed in Japanese Patent Application Publication No. 2013-35083, or Japanese Patent Application Publication No. 2016-87750 can be adopted. Conditions for interpolating the shape of the cable C by the simulation processing unit 11d are that a state in which the cable C is hidden at the time of imaging is temporary, and the entire cable C is imaged at the start time of the simulation.

The form display unit 11e causes the display unit 15 to display the shape of the cable C recognized by the image processing unit 11c and the shape of the cable C interpolated by the simulation processing unit 11d. When the shape of the cable C is displayed, the shape display unit 11e identifies the grip point (for example, by coloring in red, or the like) to causes the display.

The robot control unit 11f calculates the operation locus of the robot R for gripping the cable C, with the grip point of the cable C specified by the image processing unit 11c as a target position. The robot control unit 11f calculates the operation locus in which the robot R is operated so that the gripped cable C does not interfere with the object, on the basis of the shape of the cable C recognized by the image processing unit 11c, or the shape of the cable C interpolated by the simulation processing unit 11d. The robot control unit 11f outputs control data of each motor for operating the robot R along the calculated operation locus, to the robot R. Thereby, while gripping the grip point of the cable C and operating in the operation locus in which the gripped cable C does not interfere with the object, the robot R performs assembly of the cable C, and the like.

Referring back to FIG. 1, various system programs for controlling the shape recognition device 1 is written beforehand in the ROM 12. The RAM 13 is composed of a semiconductor memory such as a dynamic random access memory (DRAM), and stores data generated when the CPU 11 performs various processing. The input unit 14 is composed of input devices such as a mouse and a keyboard, and receives an input of various information from the user to the shape recognition device 1.

The display unit 15 is composed of a display device such as a liquid crystal display (LCD), and displays various processing results of the shape recognition device 1. The storage unit 16 is composed of a nonvolatile storage device such as a hard disk or a flash memory, and stores a program for the shape recognition processing and the robot operation control processing, and the like. The communication unit 17 includes a communication interface that performs signal processing on the basis of a predetermined communication standard such as a wireless LAN or a USB, and controls communication performed by the shape recognition device 1 with other devices such as the robot R.

The imaging unit 18 includes an imaging element of a charge coupled device (CCD) element, a stereo 3D camera, and the like, and outputs a subject image focused by a lens, as data of the captured image. In the present embodiment, the imaging unit 18 is composed of a visual sensor, and can detect various data (for example, data of a feature point, a position, a size, or the like) on the cable C, in addition to the data of the captured image of the cable C.

[Operation]

Next, the operation of the shape recognition device 1 will be described.

[Shape Recognition Processing]

Figure 7:
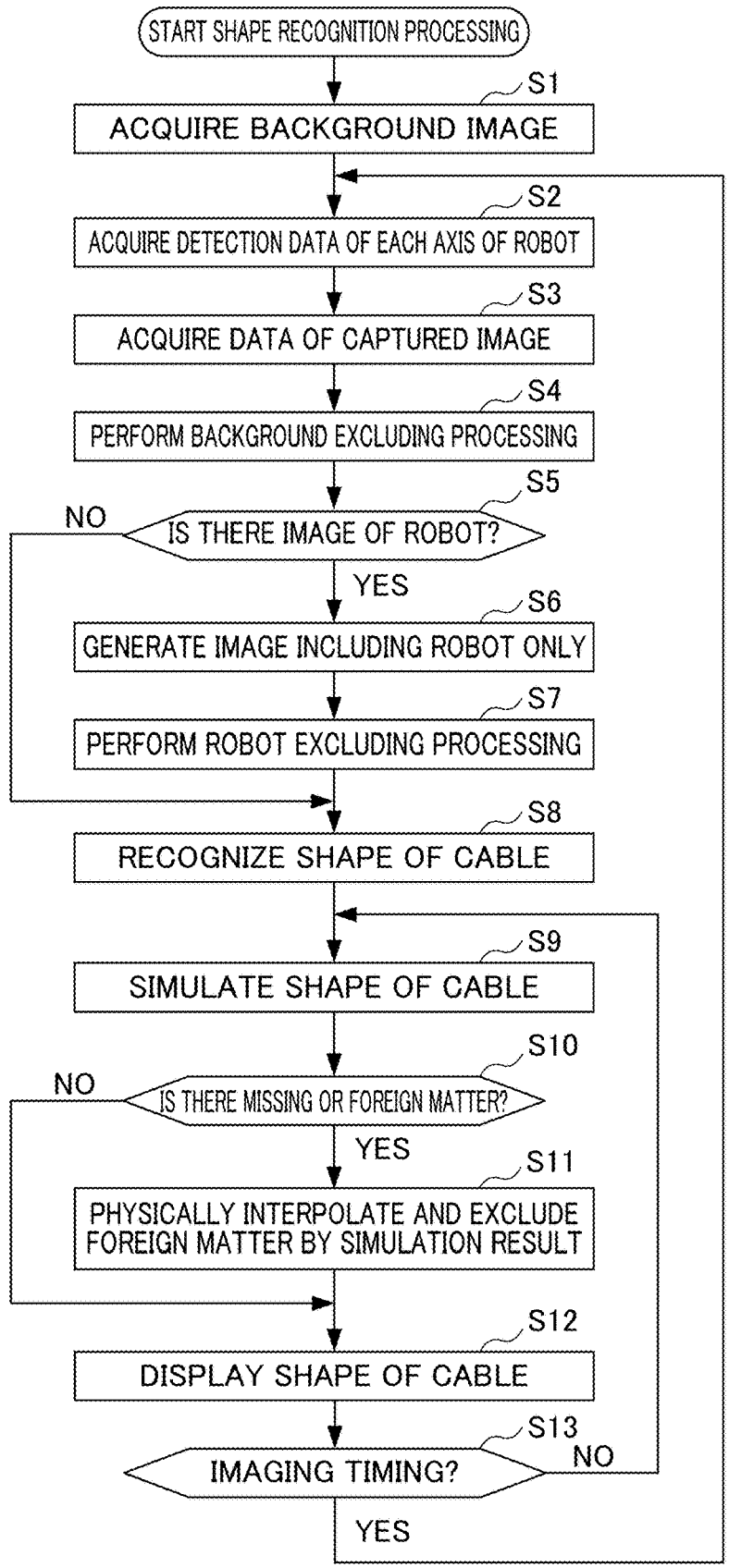
FIG. 7 is a flowchart explaining a flow of shape recognition processing performed by a CPU of the shape recognition device.

FIG. 7 is a flowchart explaining a flow of the shape recognition processing performed by the CPU 11 of the shape recognition device 1. The shape recognition processing starts when an instruction of activating the shape recognition processing is input via the input unit 14.

When the shape recognition processing starts, at step S1, the sensor information acquisition unit 11*a* acquires the background image indicating a state in which there is no cable C in the region in which the robot R grips the cable C, and the like. At step S2, the robot state acquisition unit 11*b* acquires detection data (a state of the robot) of each axis of the robot R. At step S3, the sensor information acquisition unit 11*a* acquires data of the captured image from the imaging unit 18. The data of the captured image acquired at this time includes the images of the background and the cable C. The image of the robot R is also included when the robot R performs operation of gripping of the cable C. In the processing below, the data of the captured image includes the image of the robot R.

At step S4, the image processing unit 11*c* performs processing (background excluding processing) of excluding a background in the data of the captured image on the basis of the data of the background image, and the data of the captured image in which the cable C is imaged. Thereby, in the captured image including the cable C, the background is excluded, and the regions of the cable C and the robot R are extracted.

At step S5, the image processing unit 11*c* determines whether the image in which the background is excluded includes the image of the robot R. Whether the image in which the background is excluded includes the image of the robot R, is determined by, for example, whether an object that conforms with the model of the robot R, or an object (an object having different color and shape from those of the cable C) having low likelihood as the cable C is included in the captured image. When the image in which the background is excluded includes the image of the robot R, it is determined as YES at step S5, and the processing proceeds to step S6. On the other hand, when the image in which the background is excluded does not include the image of the robot R, it is determined as NO at step S5, and the processing proceeds to step S8.

At step S6, the image processing unit 11*c* specifies the position of the robot R in the angle of view from the current state of the robot R, and generates the data of the image including only the robot R. At step S7, the image processing unit 11*c* performs processing (robot excluding processing) of excluding the image of the robot R from the image in which the regions of the cable C and the robot R are extracted, on the basis of the data of the image (the image in which the background has been extracted) in which the regions of the cable C and the robot R are extracted, and the data of the image including only the generated robot R. Thereby, in the image including the cable C and the robot R, the image of the robot R is excluded. At step S8, the image processing unit 11*c* recognizes the shape of the cable C from the data of the image.

At step S9, the shape of the cable C is simulated on the basis of the data of the captured image of the cable C and the physical characteristics of the cable C. At step S10, the image processing unit 11*c* determines whether the recognized shape of the cable C is partly missing, or whether there is a foreign matter. When the recognized shape of the cable C is partly missing, or when there is a foreign matter, it is determined as YES at step S10, and the processing proceeds to step S11. On the other hand, when the recognized shape of the cable C is not partly missing, and when there is no foreign matter, it is determined as NO at step S10, and the processing proceeds to step S12.

At step S11, the image processing unit 11*c* physically interpolates the missing portion in the recognition result of the cable C by the simulation result, and excludes the foreign matter. In the present embodiment, both interpolation and excluding of a foreign matter are performed. However, only one of those may be performed. At step S12, the shape display unit 11*e* causes the display unit 15 to display the shape of the cable C (the shape of the cable C recognized by the image processing unit 11*c* or the shape of the cable C interpolated by the simulation processing unit 11*d*).

At step S13, the sensor information acquisition unit 11*a* determines whether timing is imaging timing by the imaging unit 18 (data acquisition timing of a vision sensor). When the timing is the imaging timing by the imaging unit 18 (data acquisition timing of the vision sensor), it is determined as YES at step S13, and the processing proceeds to step S2. On the other hand, when the timing is not the imaging timing by the imaging unit 18 (the data acquisition timing of the vision sensor), it is determined as NO at step S13, and the processing proceeds to step S9. Such processing is repeated until an instruction of terminating the shape recognition processing is input.

[Robot Operation Control Processing]

Figure 8:
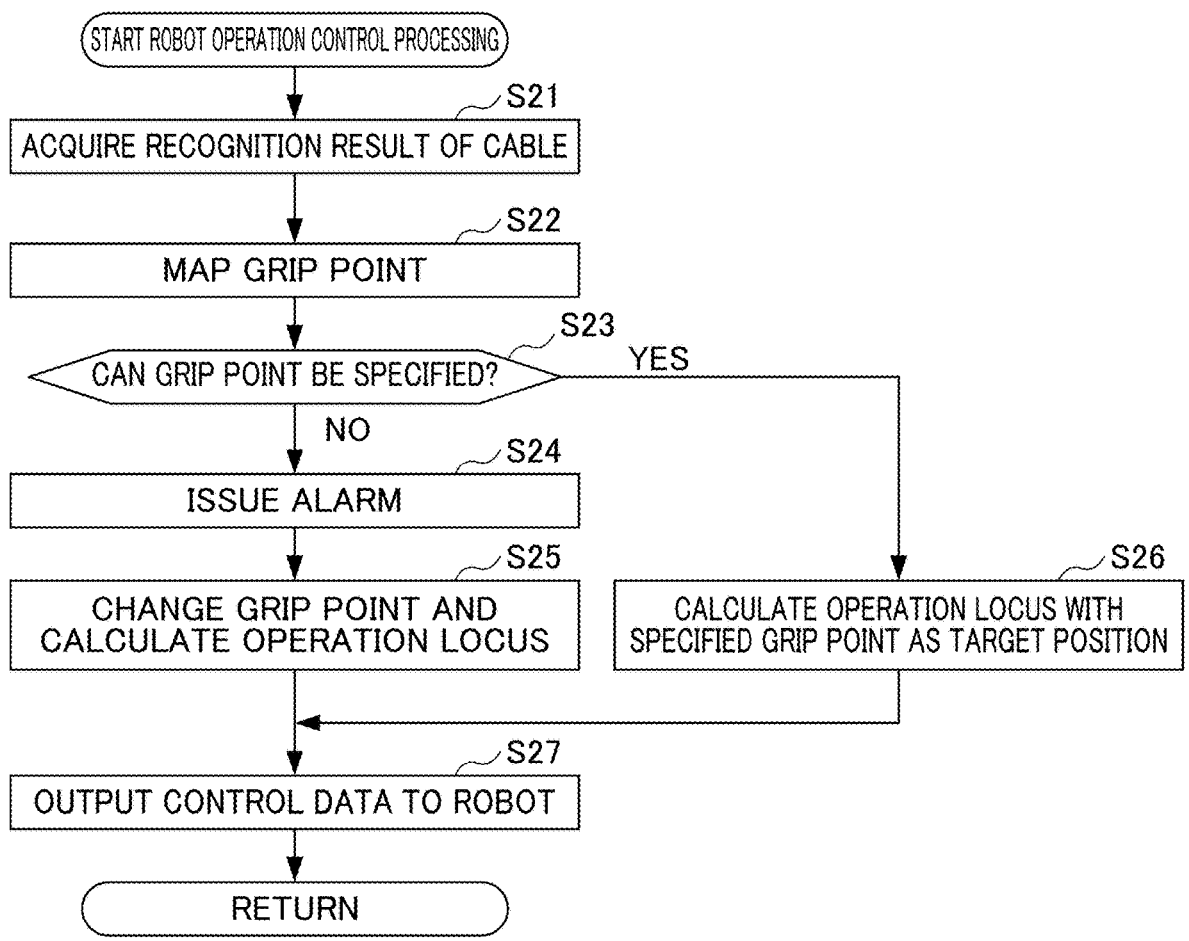
FIG. 8 is a flowchart explaining a flow of robot operation control processing performed by the CPU of the shape recognition device.

Next, robot operation control processing will be described. FIG. 8 is a flowchart explaining a flow of the robot operation control processing performed by the CPU 11 of the shape recognition device 1. The robot operation control processing starts when an instruction of activating the robot operation control processing is input via the input unit 14.

When the robot operation control processing starts, at step S21, the robot control unit 11*f* acquires the recognition result of the cable C acquired in the shape recognition processing. At step S22, the image processing unit 11*c* maps the grip point to the recognized shape of the cable C. At step S23, the image processing unit 11*c* determines whether the mapped grip point can be specified in the captured image. When the mapped grip point cannot be specified in the captured image, it is determined as NO at step S23, and the processing proceeds to step S24. On the other hand, when the mapped grip point can be specified in the captured image, it is determined as YES at step S23, and the processing proceeds to step S26.

At step S21, the image processing unit 11c outputs an alarm (sound, a message display, or the like) indicating that the grip point cannot be specified. At step S25, the image processing unit 11c changes the grip point to a portion in which the cable C is imaged, and the robot control unit 11f calculates the operation locus of the robot R with the changed grip point as a target position. After step S25, the processing proceeds to step S27. At step S26, the robot control unit 11f calculates the operation locus of the robot R with the specified grip point as a target position. At step S27, the robot control unit 11f outputs control data to the robot R so that the robot R operates in the operation locus calculated at step S25 or step S26. Such processing is repeated until the instruction of terminating the robot operation control processing is input.

[Effect]

As described above, in the shape recognition device 1 according to the present embodiment, the image processing unit 11c recognizes the shape of the cable C on the basis of the image of the cable C imaged by the imaging unit 18. The simulation processing unit 11d simulates the shape of the cable C on the basis of the image of the cable C imaged by the imaging unit 18. The simulation processing unit 11d interpolates the recognition result of the shape of the cable C by the image processing unit 11c, on the basis of the simulation result of the shape of the cable C. Thereby, the recognition result of the shape of the cable C by the image obtained by imaging the cable C, can be interpolated by the simulation result, the recognition result having higher real-time property and accuracy than that of a case with only the recognition result using the image obtained by imaging the cable C, can be acquired. That is, by the shape recognition device 1, the shape recognition of the cable C can be realized in real time with high accuracy.

In the shape recognition device 1, the simulation processing unit 11d simulates the shape of the cable C in a shorter period than the imaging period of the imaging unit 18 on the basis of the image of the cable C imaged by the imaging unit 18. Thereby, the recognition result of the shape of the cable C by the image obtained by imaging the cable C can be temporally interpolated by the simulation result.

In the shape recognition device 1, the image processing unit 11c acquires the image in which the background portion of the image of the cable C imaged by the imaging unit 18 is excluded, on the basis of the image of the cable C imaged by the imaging unit 18, and the image obtained by imaging only the background. Thereby, the object imaged in the captured image can be appropriately acquired.

In the shape recognition device 1, the image processing unit 11c acquires the image in which the image of the robot R included in the image in which the background portion is excluded, is excluded, on the basis of the image in which the background portion is excluded, and the image indicating the robot R in the image in which the background portion is excluded. Thereby, only the image of the cable C can be appropriately acquired by excluding the image of the robot R gripping the cable C.

In the shape recognition device 1, when part of the cable C is missing or when there is a foreign matter in the image of the cable C imaged by the imaging unit 18, the simulation processing unit 11d interpolates the shape of the cable C and excludes the foreign matter on the basis of the simulation result of the shape of the cable C. Thereby, the recognition result of the shape of the cable C by the image obtained by imaging the cable C can be spatially interpolated by the simulation result.

In the shape recognition device 1, the robot control unit 11f generates the operation locus in which the robot R is operated, on the basis of the recognition result of the shape of the cable C by the image processing unit 11c, or the recognition result of the shape of the cable C interpolated by the simulation processing unit 11d. Thereby, the robot R can be operated such that the recognition result of the shape of the cable C is appropriately reflected.

In the shape recognition device 1, the image processing unit 11c specifies the grip point set as a portion to be gripped by the robot R in the cable C. The robot control unit 11f generates the operation locus of the robot R so that the grip point specified by the image processing unit 11c is gripped. Thereby, the assembly of the cable C by the robot R can be performed with the set grip point appropriately gripped.

In the shape recognition device 1, when the grip point of the cable C cannot be imaged, the image processing unit 11c issues an alarm and sets a new grip point. The robot control unit 11f generates the operation locus of the robot R so that the new set grip point is gripped. Thereby, while notification that the set grip point cannot be specified is performed to the outside, operation is changed to the appropriate operation, and the robot R can be controlled.

Modification

In the embodiment described above, the cable C is described as an example of a target object of which the shape is recognized by the shape recognition device 1. However, the target object is not limited thereto. That is, examples of the target object of which shape is recognized by the shape recognition device 1 include various objects having indefinite shapes and flexibility. As the object having an indefinite shape, a linear body such as a cable, a belt, or a wire is exemplified. However, the object may be other than the linear body.

All or part of the functions of the shape recognition device 1 of the embodiment described above can be realized by hardware, software, or combination thereof. Being realized by software means being realized by a processor reading and executing a program. When the functions are configured by hardware, part or all of the functions of the shape recognition device 1 can be configured by an IC such as an application specific integrated circuit (ASIC), a gate array, a field programmable gate array (FPGA), or a complex programmable logic device (CPLD).

When all or part of the functions of the shape recognition device 1 is configured by software, in a computer composed of a storage unit such as a hard disk, a ROM, or the like, stored with a program in which all or part of operation of the shape recognition device 1 is described, a DRAM in which data required for operation is stored, a CPU, and a bus connecting each component, information required for operation is stored in the DRAM, the program is operated by the CPU, and thereby, the functions can be realized.

These programs can be stored by using various types of computer readable media, to be supplied to a computer. The computer readable media include various types of tangible storage media. Examples of the computer readable media include a magnetic storage medium (for example, a flexible disk, a magnetic tape, and a hard disk drive), a magneto-optical storage medium (for example, a magneto-optical disk), a CD-ROM (read only memory), a CD-R, a CD-R/W, a semiconductor memory (for example, a mask ROM, and a programmable ROM (PROM), an erasable PROM (EPROM), a flash memory, and a random access memory (RAM). These programs may be distributed by being downloaded to a computer of a user via a network.

The embodiment of the present invention is described above in detail. However, the embodiment described above is only a particular example of performing the present invention. The technical scope of the present invention is not limited to the embodiment described above. Various changes of the present invention can be performed within the scope not departing from the gist of the present invention, and the changes are also included in the technical scope of the present invention.

EXPLANATION OF REFERENCE NUMERALS

1 Shape recognition device
11 CPU
11a Sensor information acquisition unit
11b Robot state acquisition unit
11c Image processing unit
11d Simulation processing unit
11e Shape display unit
11f Robot control unit
12 ROM
13 RAM
14 Input unit
15 Display unit
16 Storage unit
17 Communication unit
18 Imaging unit
C Cable (object having indefinite shape)

What is claimed is:

1. A shape recognition device that recognizes a shape of an object having an indefinite shape and flexibility, and assembled by a robot, the shape recognition device comprising:
   an imaging unit that images the object;
   an image processing unit that recognize the shape of the object on the basis of an image of the object imaged by the imaging unit; and
   a simulation processing unit that simulates the shape of the object on the basis of the image of the object imaged by the imaging unit,
   wherein the simulation processing unit interpolates a recognition result of the shape of the object by the image processing unit on the basis of a simulation result of the shape of the object.

2. The shape recognition device according to claim 1, wherein the simulation processing unit simulates the shape of the object in a shorter period than an imaging period of the imaging unit on the basis of the image of the object imaged by the imaging unit.

3. The shape recognition device according to claim 1, wherein the image processing unit acquires an image in which a background portion is excluded from the image of the object imaged by the imaging unit, on the basis of the image of the object imaged by the imaging unit, and an image obtained by imaging only a background.

4. The shape recognition device according to claim 3, wherein the image processing unit acquires an image in which the image of the robot is excluded from the image in which the background portion is excluded, on the basis of the image in which the background portion is excluded and the image of the robot in the image in which the background portion is excluded.

5. The shape recognition device according to claim 1, wherein, when part of the object is missing or when there is a foreign matter in the image of the object imaged by the imaging unit, the simulation processing unit interpolates the shape of the object or excludes the foreign matter on the basis of the simulation result of the shape of the object.

6. The shape recognition device according to claim 1, further comprising a robot control unit that generates an operation locus in which the robot is operated, on the basis of the recognition result of the shape by the image processing unit, or a recognition result of the shape of the object interpolated by the simulation processing unit.

7. The shape recognition device according to claim 6, wherein the image processing unit specifies a grip point that is set as a portion of the object to be gripped by the robot, and
   the robot control unit generates the operation locus of the robot so that the robot grips the grip point specified by the image processing unit.

8. The shape recognition device according to claim 7, wherein the image processing unit issues an alarm when the grip point of the object cannot be imaged, and sets new grip point, and
   the robot control unit generates the operation locus of the robot so that the newly set grip point is gripped.

9. A shape recognition method for recognizing a shape of an object having an indefinite shape and flexibility and assembled by a robot, the method comprising:
   an imaging step of imaging the object;
   an image processing step of recognizing the shape of the object on the basis of an image of the object imaged in the imaging step; and
   a simulation processing step of simulating the shape of the object on the basis of the image of the object imaged in the imaging step,
   wherein, in the simulation processing step, a recognition result of the shape of the object in the image processing step is interpolated on the basis of a simulation result of the shape of the object.

10. A non-transitory recording medium storing a program that for a computer that controls a shape recognition device that recognizes a shape of an object having an indefinite shape and flexibility and assembled by a robot, the program causing the computer to realize:
   an imaging control function of imaging the object;
   an image processing function of recognizing the shape of the object on the basis of an image of the object imaged by the imaging control function; and
   a simulation processing function of simulating the shape of the object on the basis of the image of the object imaged by the imaging control function,
   wherein the simulation processing function interpolates a recognition result of the shape of the object by the image processing function on the basis of a simulation result of the shape of the object.

* * * * *